United States Patent [19]

Iwane et al.

[11] Patent Number: 5,734,940
[45] Date of Patent: Mar. 31, 1998

[54] FILM SENSITIVITY SETTING AND DISPLAY DEVICE FOR A CAMERA

[75] Inventors: Yukikazu Iwane, Kawasaki; Yoshikazu Iida, Chigasaki; Kiyosada Machida, Urawa; Masayuki Koga, Fuchu, all of Japan

[73] Assignee: Nikon Corporation, Tokyo, Japan

[21] Appl. No.: 584,011

[22] Filed: Jan. 11, 1996

[30] Foreign Application Priority Data

Feb. 8, 1995 [JP] Japan ................. 7-043499
Feb. 8, 1995 [JP] Japan ................. 7-043500
Feb. 8, 1995 [JP] Japan ................. 7-043501

[51] Int. Cl.⁶ .................... G03B 7/00; G03B 17/00
[52] U.S. Cl. ............................ 396/299; 396/237
[58] Field of Search ............... 354/21, 289.12, 354/173.1, 173.11, 195.1, 195.12, 105, 106; 396/207, 208, 237, 245, 281, 292, 297, 299

[56] References Cited

U.S. PATENT DOCUMENTS

| | | |
|---|---|---|
| 4,866,467 | 9/1989 | Taniguchi et al. ............ 354/21 |
| 4,943,825 | 7/1990 | Taniguchi et al. ............ 354/106 |
| 5,220,364 | 6/1993 | Kobayshi et al. ............ 354/21 |
| 5,289,216 | 2/1994 | Ohsawa et al. ............ 354/21 |
| 5,293,189 | 3/1994 | Taniguchi et al. ............ 354/21 |

*Primary Examiner*—David M. Gray
*Assistant Examiner*—Nicholas J. Tuccino

[57] ABSTRACT

A camera adapted to obtain a correct exposure, even with a film having a film sensitivity outside an automatic setting range of the camera. A film sensitivity outside the automatic setting range of the camera is stored, or canceled by manipulating a manipulation member in a manipulation order that differs from that used during photography. Further, two manipulation members may be used in a combined manipulation order that differs from that used during photography. For example, a zoom up and a zoom down switch may be used in conjunction with a main switch to set a higher and a lower, respectively, film sensitivity. Additionally, the setting may be canceled by manipulating the zoom up and zoom down switches simultaneously. A display device which normally displays photographic information regarding the camera, temporarily displays the manually set film sensitivity.

22 Claims, 3 Drawing Sheets

FILM SENSITIVITY SETTING AND DISPLAY DEVICE FOR A CAMERA

BACKGROUND OF THE INVENTION

1. Field of the Invention

The present invention relates to a film sensitivity setting and display device for a camera, and, in particular, to a film sensitivity setting and display device which can sense, store and display film ISO sensitivity and provide a manual override for adjusting the film sensitivity setting.

2. Description of the Related Art

Film ISO sensitivity (hereinafter "film sensitivity") is typically automatically set by a sensitivity reading device which reads a DX code printed on a film cartridge. The sensed film sensitivity is provided to an exposure control means which controls the settings of the camera during exposure. However, if the DX code listed on the film cartridge is outside the automatic setting range of the camera, or the sensing range of the sensitivity reading device, the film designation will be set to an incorrect film sensitivity, and the correct exposure will not be obtained. Further, if provisions are made for setting the film sensitivity manually, costly custom manipulation members and a display device, which allow the photographer to set and determine the film sensitivity, must be provided.

SUMMARY OF THE INVENTION

Accordingly, it is an object of the present invention to provide a cost effective camera able to obtain a correct exposure, even with a film having an ISO sensitivity outside an automatic setting range of the camera.

It is also an object of the present invention to provide a cost effective camera able to display the film sensitivity of the film to the photographer.

It is also an object of the present invention to provide a camera in which it is possible to erase a film sensitivity setting, previously stored in a memory, by manipulation of an existing manipulation member.

Additional objects and advantages of the invention will be set forth in part in the description which follows, and, in part, will be obvious from the description, or may be learned by practice of the invention.

Objects of the present invention are achieved in a camera having a sensitivity reading unit that reads a film sensitivity of a photographic film, an exposure control unit which controls an exposure corresponding to the film sensitivity, a manipulation member which the photographer manipulates to indicate :the photographic conditions to the exposure control unit, the manipulation member being manipulated in a manipulation order that differs from that used during photography to manually indicate to the exposure control unit a different film sensitivity than is read by the sensitivity reading unit.

Objects of the present invention are also achieved in a camera having a sensitivity reading unit which reads a film sensitivity of a photographic film, an exposure control unit which controls an exposure corresponding to the film sensitivity, a first and second manipulation member which the photographer manipulates to indicate photographic conditions to the exposure control unit, the first and second manipulation members being simultaneous manipulated in a combined manipulation sequence that differs from that used during photography to indicate to the exposure control unit a different film sensitivity than is read by the film sensitivity reading unit.

Objects of the present invention are achieved in a camera in which a manipulation member is manipulated in a manipulation sequence that differs from the manipulation sequence used during photography so as to indicate to the exposure control device a different film sensitivity than is read by a sensitivity reading device, such that a correct exposure can be obtained even with a film having a film sensitivity outside the automatic setting range of the camera.

Objects of the present invention are also achieved in a camera in which a first and second manipulation members are simultaneously manipulated in a combined manipulation order that differs from the manipulation order used during photography to indicate a different film sensitivity to the exposure control unit than is read by a sensitivity reading device, such that the combined manipulation, which clearly differs from that used during photography, is executed in relation to the two manipulation members, allowing the film sensitivity to be set accurately without making mistakes in manipulation.

Objects of the present invention are also achieved in a camera which displays a film sensitivity on a display device which displays photographic information regarding the camera and a sensitivity setting unit which sets the film sensitivity automatically or manually, wherein the film sensitivity set by the sensitivity setting unit is displayed on the display device.

Objects of the present invention are also achieved in a camera in which a display device displays a film sensitivity setting in addition to other photographic information.

Objects of the present invention are also achieved in a camera which can set and cancel film sensitivity having a manipulation unit which a photographer manipulates to set the photographic conditions, a sensitivity setting unit which sets the film sensitivity automatically or manually, and a memory device which stores the film sensitivity set by the sensitivity setting unit, wherein the film sensitivity stored in the memory device is erased by manipulating the manipulation member in a predetermined manner.

Objects of the present invention are further achieved by a camera comprising a film sensitivity reading unit for reading an ISO value, indicating film sensitivity, from a film cartridge, the film sensitivity reading unit adapted to read a predetermined range of ISO values, an exposure control unit which controls an exposure process of the camera based on the ISO value, and a first manipulation member which a photographer manipulates in a first manner to operate a predetermined function in the camera and which the photographer manipulates in a second manner to set an ISO value different from the ISO value read by the film sensitivity reading unit.

Objects of the present invention are also achieved by a camera comprising a sensitivity setting unit adapted to set a film sensitivity value, the sensitivity setting unit having an automatic and a manual mode, and a display unit having a plurality of parts, each part adapted to display a predetermined piece of photographic information about the camera, the display unit indicating the film sensitivity set by the sensitivity setting unit on a part of the display unit.

Objects of the present invention are also achieved by a camera comprising a sensitivity setting unit adapted to set a film sensitivity value, the sensitivity setting unit having an automatic and a manual mode, a memory device which stores the film sensitivity value set by the sensitivity setting unit, and a first manipulation member which a photographer manipulates in a first manner to operate a predetermined function in the camera and which the photographer manipulates in a second manner to cancel the film sensitivity value stored in the memory device.

Objects of the present invention are further achieved by a method of setting a film sensitivity value for a camera comprising simultaneously pressing a main power switch of the camera and a zoom up switch of the camera to increase a preset film sensitivity value, and simultaneously pressing the main power switch and a zoom down switch of the camera to decrease the film sensitivity value.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Reference will now be made in detail to a present preferred embodiment of the present invention, examples of which are illustrated in the accompanying drawings, wherein like reference numerals refer to like elements throughout.

Figure 1:
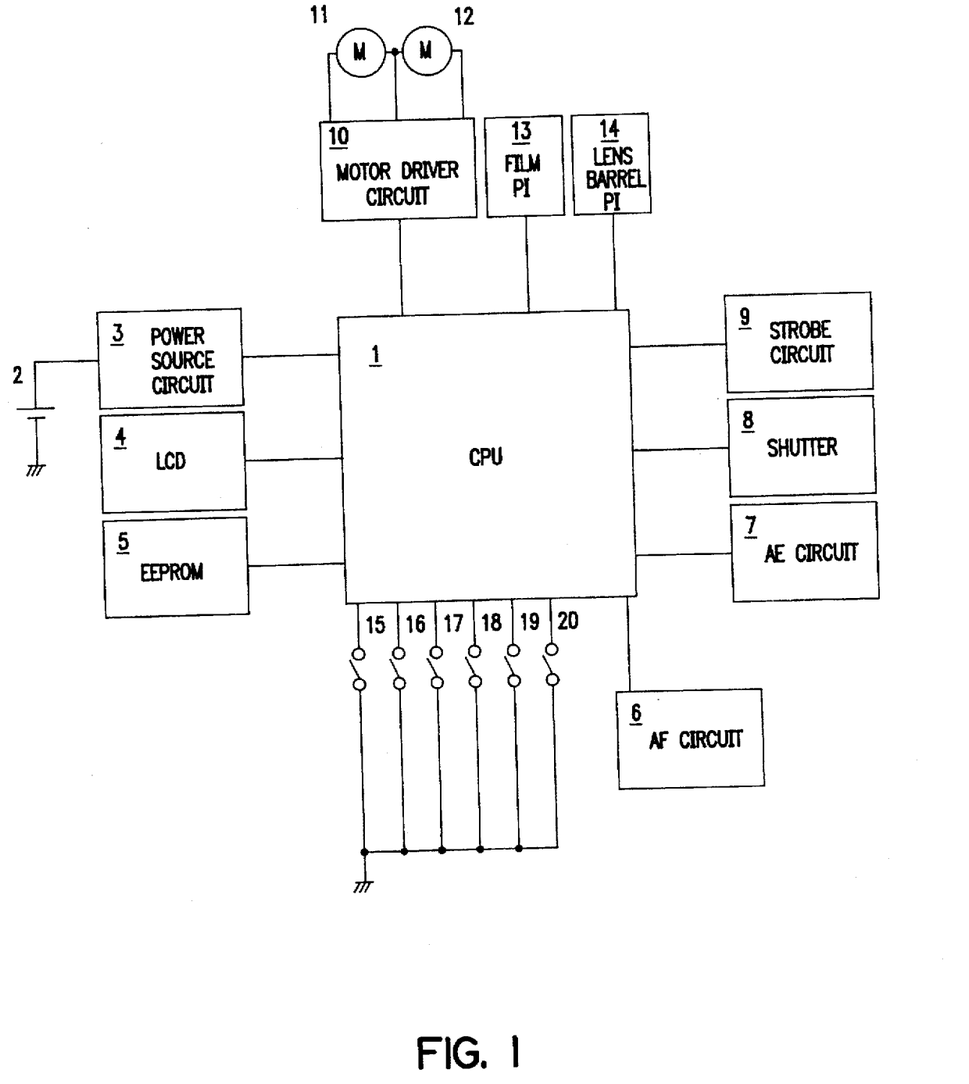
FIG. 1 is a block diagram of a camera in accordance with a preferred embodiment of the present invention.

FIG. 1 is a block diagram of a camera in accordance with a preferred embodiment of the present invention.

A CPU 1 is a one chip micro-computer which controls photographic operations in the camera. The CPU 1 is provided with devices (not shown) such as a timer which measures time, a counter, and an A/D converter. In general, the electronic circuit of the camera comprises a power source circuit 3, a display device (LCD) 4, a non-volatile memory (EEPROM) 5, an autofocus ("AF") circuit 6, an autoexposure ("AE") circuit 7, a shutter 8, a strobe or light generation circuit 9, a motor driver circuit 10, a film photo interrupter (film PI) 13, and a lens barrel photo interrupter (lens barrel PI) 14, all of which are connected to the CPU 1.

The power source circuit 3 uses a battery 2 as a power source. The power source circuit 3 regulates the battery voltage of the battery 2 and supplies power to the various circuits of the camera. The LCD 4 displays preselected photographic information, such as the photographic mode, the film frame number, the zoom position and the date. The EEPROM 5 stores predetermined data necessary for photographic processing. The CPU 1 reads the predetermined data, as required, when conducting specific photographic processing.

The AF circuit 6 transmits distance measurement data, corresponding to the distance to the subject, to the CPU 1. The CPU 1 calculates the distance to the subject based on the distance measurement data. The AE circuit 7 transmits light measurement data, corresponding to the brightness of the subject, to the CPU 1. The CPU 1 calculates a shutter speed for the shutter 8, and an aperture value based on the light measurement data and a film sensitivity of the film. The shutter 8 executes an opening and closing of a shutter sector (not shown), and conducts exposure at the calculated shutter speed and aperture value.

The strobe circuit 9 generally comprises a strobe condenser voltage increase part (not shown) and a flash control part (not shown). The voltage increase part and the flash control part are controlled by signals from the CPU 1.

The film photo interrupter 13 sends pulse signals, corresponding to a film feeding operation, to the CPU 1. The CPU 1 counts the feed pulse signals, and controls the motor driver circuit 10 to feed the film. Specifically, the CPU 1 outputs signals causing the motor driver circuit 10 to drive a film motor 11 so as to wind the film.

The lens barrel photo interrupter 14 sends pulse signals, corresponding to the up and down zooming of a lens barrel, to CPU 1. The CPU 1 counts, the lens barrel pulse signals and controls the motor driver circuit 10. Specifically, the CPU 1 outputs signals causing the motor driver circuit 10 to drive a lens barrel motor 12 so as to zoom a lens barrel (not shown) up and down, i.e. so the lens barrel rotates forward and backward.

A set number of manipulation members, including a main switch 15, a zoom up switch 16, a zoom down switch 17, a back cover switch 18, a release button half push switch 19, and a release button full push switch 20 are connected to the CPU 1.

The main switch 15 is, preferably, a momentary switch, and constitutes a manipulation member which, every time it is turned ON, cyclically renders the camera between a state in which photographs can be taken and a state in which photographs cannot be taken, i.e. the camera turns ON and OFF. The zoom up switch 16 is a manipulation member which zooms the lens barrel up when it is turned ON. Similarly, the zoom down switch 17 is a manipulation member which zooms the lens barrel down when turned ON. The back cover switch 18 is a manipulation member which goes ON or OFF corresponding to whether the back cover of the camera is opened or closed. The release button half push switch 19 is a manipulation member which is turned ON when a release button (not shown) is pressed half way down. Preferably, when the release button half push switch 19 is turned ON, light measurement and distance measurement are conducted. The release button full push switch 20 is a manipulation member which turns ON when the release button is pressed all the way down. When the release button full push switch 20 is turned ON, the camera conducts exposure processing.

Figure 2A:
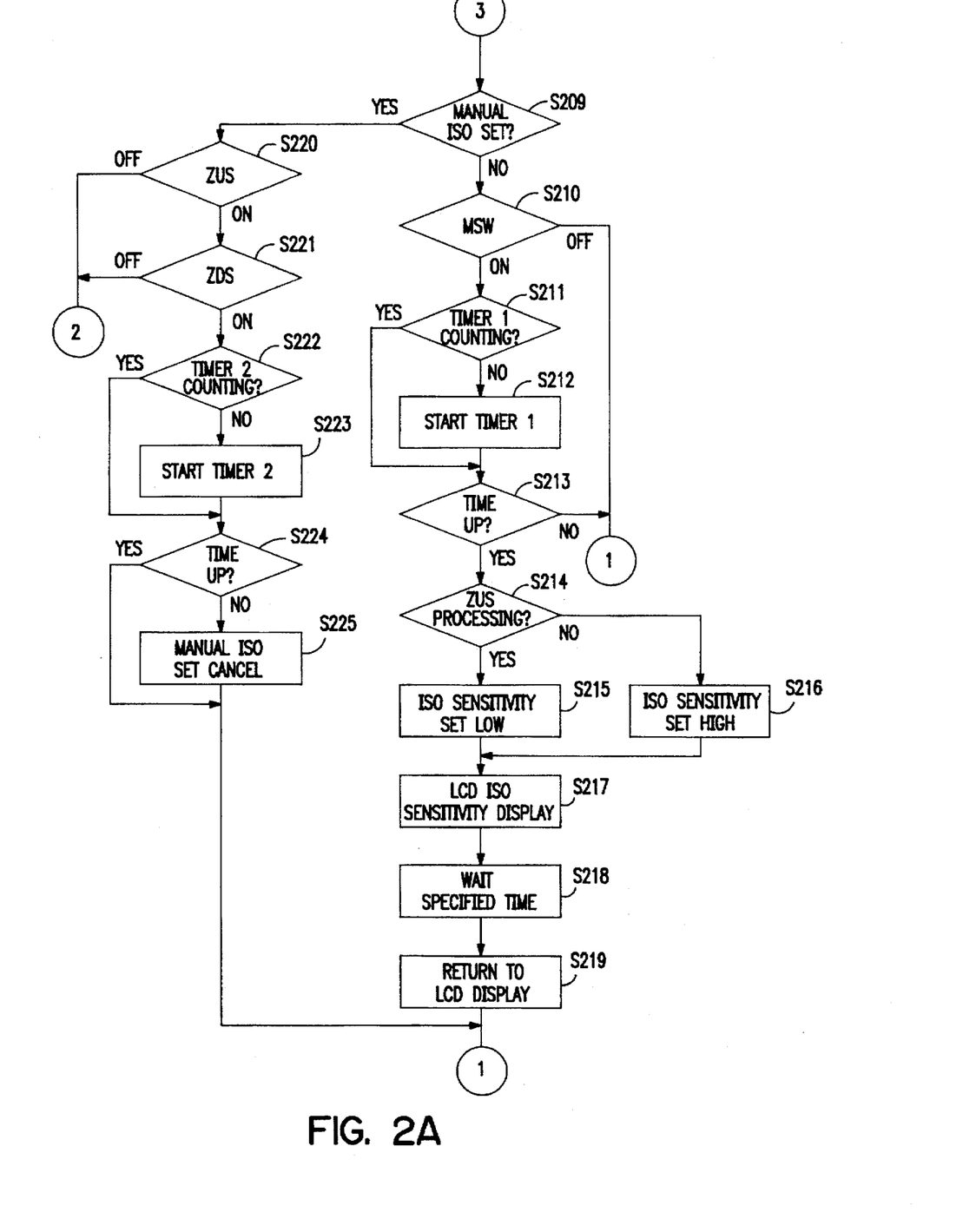
FIG. 2A is a flow chart showing the operation of a camera in accordance with a preferred embodiment of the present invention.
Figure 2B:
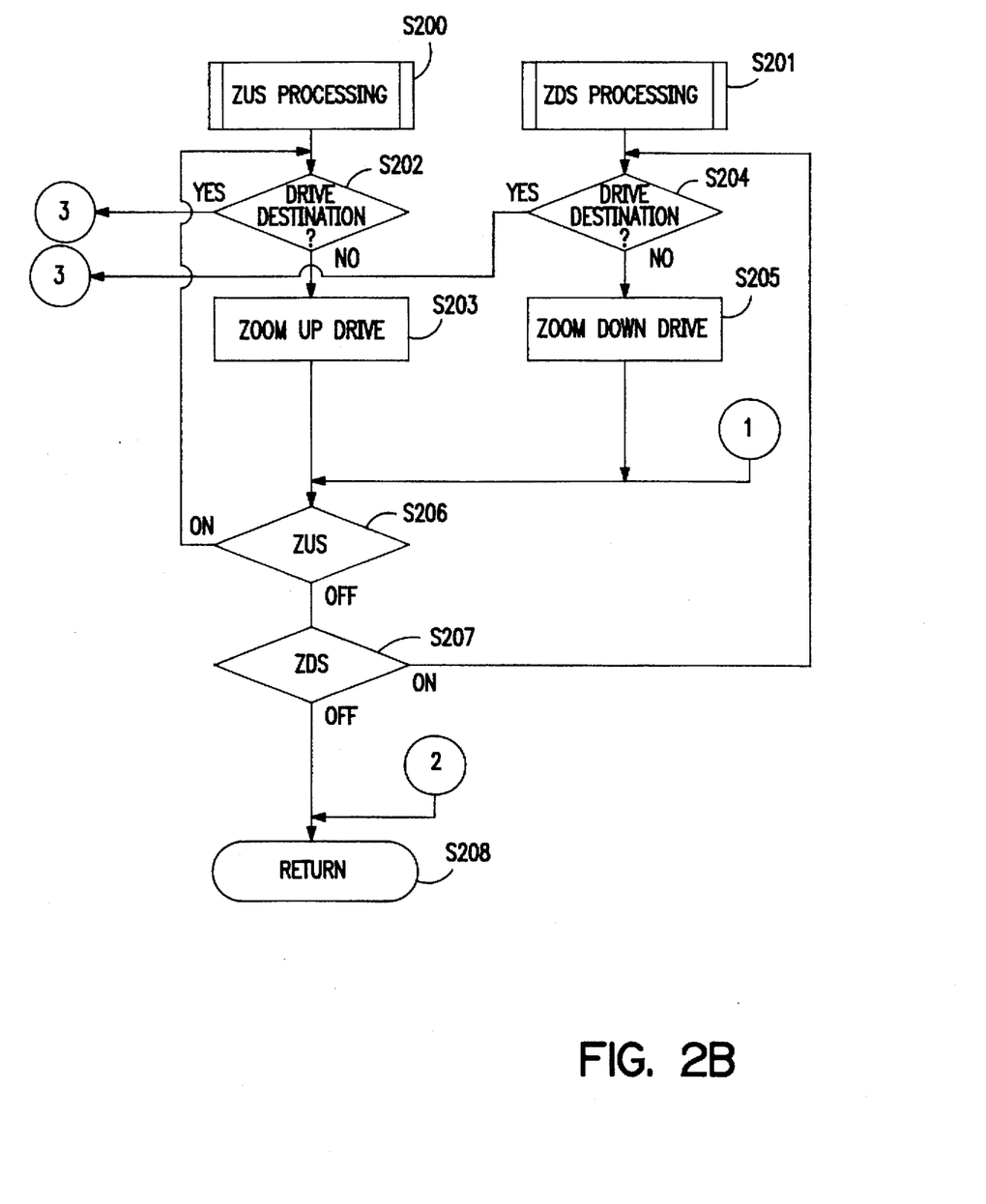
FIG. 2B is a continuation of the flow chart set forth in FIG. 2A showing the operation of a camera in accordance with a preferred embodiment of the present invention.

FIGS. 2A and 2B are flow charts showing the operation of a camera in accordance with a preferred embodiment of the present invention. The operation set forth in FIGS. 2A and 2B are called from a main routine (not shown) and is typically performed by the CPU 1.

Referring to FIG. 2B, when the main switch 15 has been turned ON and the camera is in a state capable of photography, if the zoom up switch 16 is turned ON, ZUS processing (zoom up processing) begins at step S200. Thereafter, in step S202, a determination is made as to whether the lens barrel has been driven to a specified drive destination. If the lens barrel has reached the drive destination, the operation advances to step S209 (FIG. 2A), otherwise, the operation advances to step S203. In step S203, the motor driver circuit 10 drives the lens barrel motor 12 to the specified lens barrel drive destination, based on signals from CPU 1, and the operation advances to step S206.

If, prior to the above operations, the main switch 15 is turned ON and the camera is in the photograph capable state, when the zoom down switch 17 has been turned ON, ZDS processing (zoom down processing) begins from step S201.

In step S204, a determination is made as to whether the lens barrel has been driven a specified drive destination. If the lens barrel has reached the specified drive destination, the operation advances to step S209 (FIG. 2A), otherwise, the operation advances to step S205. In step 205, the motor driver circuit 10 drives the lens barrel motor 12 to the specified drive destination, based on signals from CPU 1, and the operation advances to step S206.

In step S206, it is determined whether the zoom up switch 16 is ON. If the zoom up switch 16 is ON, the operation returns to step S202, otherwise, the operation advances to step S207. In step S207, it is determined whether the zoom down switch 17 is ON. If the zoom down switch is ON, the operation returns to step S204, otherwise, the operation advances to step S208. In step S208, the operation returns to the main routine (not shown).

Referring to FIG. 2A, in step S209, a determination is made as to whether the ISO sensitivity is being set by manual manipulation. If the ISO sensitivity is not being manually set, the operation advances to step S210. In step S210, a determination is made as to whether the main switch 15 is ON or OFF. If the main switch 15 is OFF, the operation returns to step S206 (FIG. 2B); otherwise, the operation advances to step S211.

In step S211, a determination is made as to whether a first timer (timer 1, not shown) is counting. If the timer 1 is counting, the operation advances to step S213, otherwise, the operation advances to step S212. In step S212, the timer 1 is started, and the operation advances to step S213. In step S213, the timer 1 determines whether time is up. If time is not up, the operation advances to step S206 (FIG. 2B), otherwise, the operation advances to step S214. In step S214, a determination is made as to whether ZUS processing is in effect, i.e. whether the zoom up switch 16 is ON. If ZUS processing is in effect, the operation advances to step S215. In step S215, assuming that a specified film sensitivity has been selected that is higher than the film sensitivity read from the DX code, the specified film sensitivity is set in a memory device (not shown) within CPU 1, and the operation advances to step S217. If, in step S214, ZUS processing is not in effect, the operation advances to step S216. In step S216, assuming that a specified film sensitivity that is lower than the film sensitivity read from the DX code is selected, the specified film sensitivity is set in the memory device within CPU 1, and the operation advances to step S217.

In step S217, the upper digits, i.e. the most significant digits, of the set film sensitivity are displayed in a film frame number display section (not shown) of the LCD 4, and the operation advances to step S218. In step S218, the display of the film frame number display part of the LCD 4 is continued for a specified time, and the operation advances to step S219. In step S219, the display on the LCD 4 returns to the original film frame number display, and the operation advances to step S206. The display of the most significant digits of the set film sensitivity on the film frame number display part of LCD 4 is displayed as, for example, "16" if the film sensitivity is set to ISO 1600, and "5" if the film sensitivity is set to ISO 50.

In this way, with zoom up switch 16 in the ON state, by simultaneously turning main switch 15 ON and continuing to hold it ON for a specified time, a specified film sensitivity higher than the film sensitivity read from the DX code can be set. Also, with zoom down switch 17 in the ON state, by simultaneously turning main switch 15 ON and continuing to hold it ON for a specified time, a specified film sensitivity lower than the film sensitivity read from the DX code can be set.

In step S209, if the film sensitivity is being manually set, the operation advances to step S220. In step S220, a determination is made as to whether the zoom up switch 16 is turned ON. If the zoom up switch 16 is not turned ON, the operation advances to step S208 (FIG. 2B); otherwise, the operation advances to step S221. In step S221, a determination is made as to whether the zoom down switch 17 is turned ON. If the zoom down switch 17 is not turned ON, the operation advances to step S208 (FIG. 2B), otherwise, the operation advances to step S222.

In step S222, a determination is made as to whether a second timer (timer 2) is in the process of counting. If the timer 2 is in the process of counting, the operation advances to step S224, otherwise, the operation advances to step S223. In step S223, the timer 2 is started and the operation advances to step S224. In step S224, a determination is made as to whether the time of timer 2 is up. If time is up, the operation advances to step S206 (FIG. 2B); otherwise, the operation advances to step S225. In step S225 the film sensitivity setting set by manual manipulation is canceled. Thereafter, the operation proceeds to step S206 (FIG. 2B). In this way, by continuing to hold the zoom up switch 16 and the zoom down switch 17 ON for a specified time, the film sensitivity setting set by manual manipulation can be canceled.

Although the preferred embodiment of the present invention has been described with respect to a specific configuration, it will be recognized that the preferred embodiment is not limited to the specific configuration. For example, in accordance with the preferred embodiment of the present invention, the film sensitivity, set by manual manipulation, was canceled by continuing to hold the zoom up switch 16 and the zoom down switch 17 ON for a specified time. However, it is also possible to cancel the setting, for example, when the back cover switch 18 goes ON by opening the back cover of the camera. Moreover, the setting could also be canceled when the battery 2 is replaced. In this case, exchanging the battery can be detected by a switch, connected to the battery, or by monitoring the voltage value of the battery. However, by reading the film sensitivity, set by manual manipulation, into the EEPROM 5, the setting does not need to be canceled when replacing battery 2.

Further, while the film sensitivity was displayed on the film frame count display part of LCD 4, the film sensitivity could be displayed in other parts of the LCD 4, for example in a date display part.

According to the preferred embodiment of the present invention, in a camera which executes exposure control corresponding to the film sensitivity, if, with the zoom down switch 17 ON, the main switch 15 is simultaneously held ON a specified time, a specified ISO sensitivity can be set that is lower than the film sensitivity automatically set from the film DX code. Also, if, with the zoom up switch 16 in the ON state, the main switch 15 is simultaneously held ON for a specified time, a specified film sensitivity can be set that is higher than the film sensitivity set automatically from the DX code. If the zoom up switch 16 and the zoom down switch 17 are simultaneously turned ON for a specified time, the film sensitivity, set and recorded by manual operation, is canceled.

Because a film sensitivity may be manually indicated to the exposure control unit, by manipulation of existing manipulation members in a unique manipulation order, correct exposure can be obtained with a film having a film sensitivity outside the detection range of the camera.

Moreover, in accordance with the preferred embodiment of the present invention, the combination of manipulations clearly differ from those during photography, allowing a photographer to accurately set the film sensitivity without making a mistake in the manipulation. Thus, it is possible to use film having a film sensitivity outside the film sensitivity of the camera, without providing more DX cutoff pieces for reading the DX code than necessary. Because existing manipulation members are used, costs to implement the present invention are constrained.

If the film sensitivity is outside the automatically set range and is manually set to an incorrect value, the film sensitivity stored in the memory device may be canceled by manipulating the existing manipulation member in a unique manner. In this way, it is possible to avoid incorrect exposure of film with a film sensitivity outside the automatically set range of the camera. Because existing manipulation members are used, costs to implement the present invention are constrained Further, because the upper digits of the film sensitivity, set by a manual operation, is displayed on the film frame count display part or the date display part of the LCD 4, a custom display device is not required. Because an existing display is used, costs to implement the present invention are constrained.

Although a preferred embodiments of the present invention have been shown and described, it would be appreciated by those skilled in the art that changes may be made in the embodiment without departing from the principles and spirit of the invention, the scope of which is defined in the claims and their equivalents.

What is claimed is:

1. A camera comprising:
    a film sensitivity reading unit for reading an ISO value, indicating film sensitivity, from a film cartridge, said film sensitivity reading unit adapted to read a predetermined range of ISO values;
    an exposure control unit which controls an exposure process of the camera based on the ISO value;
    a first manipulation member which a photographer manipulates in a first manner to turn the camera on and off; and
    a second manipulation member which a photographer manipulates in a first manner to perform a zoom operation in the camera and which the photographer manipulates in a second manner in conjunction with the manipulation of said first manipulation member to set an ISO value different than the ISO value read by said film sensitivity reading unit.

2. A camera, as set forth in claim 1, further comprising:
    a memory device that stores the ISO value.

3. A camera, as set forth in claim 2, wherein said memory device is a non-volatile memory.

4. A camera as set forth in claim 1, wherein:
    the second manipulation member is a zoom down switch which is operated in the first manner to drive a lens barrel from a telephoto position toward a wide angle position.

5. A camera, as set forth in claim 4, wherein the zoom down switch is operated in the second manner by holding the zoom down switch ON while holding the main switch ON for a predetermined period of time and the main switch is operated in the second manner by holding the main switch ON while holding the zoom down switch ON for the predetermined period of time.

6. A camera, as set forth in claim 4, wherein when the main switch is operated in the second manner and the zoom down switch is operated in the second manner a specified ISO value is set which is lower than the ISO value read by said film sensitivity reading unit.

7. A camera, as set forth in claim 1, wherein:
    the second manipulation member is a zoom up switch which is operated in the first manner to drive a lens barrel from a wide angle position toward a telephoto position.

8. A camera, as set forth in claim 7, wherein the zoom up switch is operated in second manner by holding the zoom up switch ON while holding the main switch ON for a predetermined period of time and the main switch is operated in the second manner by holding the main switch ON while holding the zoom up switch ON for the predetermined period of time.

9. A camera, as set forth in claim 7, wherein when the main switch is operated in the second manner and the zoom up switch is operated in the second manner a specified ISO value is set which is higher than the ISO value read by said film sensitivity reading unit.

10. A camera having an automatic sensitivity mode and a manual sensitivity mode, the camera comprising:
    a sensitivity setting unit adapted to read and set a film sensitivity value in the automatic mode;
    a first manipulation member which a photographer manipulates in a first manner to turn the camera on and off; and
    a second manipulation member which a photographer manipulates in a first manner to perform a zoom operation in the camera and which the photographer manipulates in a second manner in conjunction with the manipulation of said first manipulation member to activate the manual mode and set the film sensitivity value different than the film sensitivity value set by said sensitivity setting unit; and
    a display unit having a plurality of parts, each part adapted to a display a predetermined piece of photographic information about the camera, the display unit indicating the most significant digits of the set film sensitivity value on a part of the display unit which normally displays another piece of photographic information.

11. A camera, in accordance with claim 10, wherein the predetermined piece of photographic information about the camera includes a date, the display device indicates the film sensitivity set by the sensitivity setting unit in the manual mode and the part of the display unit is adapted to display the date.

12. A camera, in accordance with claim 10, wherein the film sensitivity is displayed for a specified time period.

13. A camera, in accordance with claim 10, wherein the predetermined piece of photographic information about the camera includes a film frame number, the display unit indicates the film sensitivity set by the sensitivity setting unit in the manual mode and the part of the display unit is adapted to display the film frame number.

14. A camera, in accordance with claim 10, wherein the first manipulation member comprises a battery voltage detection unit which detects a voltage of a battery in the camera and clears the film sensitivity data in response to detecting that the voltage is below a predetermined value, and wherein the first and second manners are the same.

15. A camera comprising:
    a sensitivity setting unit adapted to set a film sensitivity value, the sensitivity setting unit having an automatic and manual mode;
    a memory device which stores the film sensitivity value set by the sensitivity setting unit; and a switch responding to the opening and closing of a back cover of the camera to cancel the film sensitivity value stored in said memory device.

16. A camera, in accordance with claim 15, wherein the memory device is non-volatile memory.

17. A camera comprising:

a sensitivity setting unit adapted to set a film sensitivity value, the sensitivity setting unit having an automatic and manual mode;

a memory device which stores the film sensitivity value set by the sensitivity setting unit;

a zoom down switch which is operated in the first manner to drive a lens barrel from a telephoto position toward a wide angle position and in a second manner to cancel the film sensitivity value stored in said memory device; and a zoom switch which drives the lens barrel from the wide angle position toward the telephoto position, wherein the second manner comprises manipulating the zoom down switch in conjunction with the zoom up switch.

18. A camera, in accordance with claim 17, wherein the zoom down switch is operated in the second manner by turning the zoom down switch ON and simultaneously turning the zoom up switch ON for a specific time period.

19. A camera comprising:

a sensitivity setting unit adapted to set a film sensitivity value, the sensitivity setting unit having an automatic and manual mode;

a memory device which stores the film sensitivity value set by the sensitivity setting unit; and a switch responding to a replacement of a battery in the camera to cancel the film sensitivity value stored in the memory device.

20. A method of setting a film sensitivity value for a camera comprising:

simultaneously pressing a main power switch of the camera and a zoom up switch of the camera to increase a preset film sensitivity value; and simultaneously pressing the main power switch and a zoom down switch of the camera to decrease the film sensitivity value.

21. A method, as set forth in claim 20, further comprising:

storing the selected film sensitivity value; and simultaneously pressing the zoom up switch and the zoom down switch for a predetermined period of time to erase the stored film sensitivity value.

22. A camera comprising:

a film sensitivity reading unit for reading an ISO value, indicating film sensitivity, from a film cartridge, said film sensitivity reading unit adapted to read a predetermined range of ISO values;

an exposure control unit which controls an exposure process of the camera based on an ISO value; and a first manipulation member which a photographer manipulates in a first manner to operate a predetermined function in the camera and which the photographer manipulates in a second manner to set an ISO value different from the ISO value read by said film sensitivity reading unit in a range greater than the predetermined range readable by the film sensitivity processing unit.

\* \* \* \* \*

UNITED STATES PATENT AND TRADEMARK OFFICE
CERTIFICATE OF CORRECTION

PATENT NO.:     5,734,940
DATED     :     March 31, 1998
INVENTOR(S):    Yukikazu Iwane, et al.

It is certified that error appears in the above-identified patent and that said Letters Patent is hereby corrected as shown below:

Please delete drawing sheets 1, 2A & 2B, and substitute drawings sheets 1, 2A & 2B as per attached.

Signed and Sealed this

Eleventh Day of January, 2000

Attest:

Q. TODD DICKINSON

Attesting Officer

Acting Commissioner of Patents and Trademarks

United States Patent
Iwane et al.

[11] Patent Number: 5,734,940
[45] Date of Patent: Mar. 31, 1998

[54] FILM SENSITIVITY SETTING AND DISPLAY DEVICE FOR A CAMERA

[75] Inventors: Yukikazu Iwane, Kawasaki; Yoshikazu Iida, Chigasaki; Kiyosada Machida, Urawa; Masayuki Koga, Fuchu, all of Japan

[73] Assignee: Nikon Corporation, Tokyo, Japan

[21] Appl. No.: 584,011

[22] Filed: Jan. 11, 1996

[30] Foreign Application Priority Data

| Feb. 8, 1995 | [JP] | Japan | 7-043499 |
| Feb. 8, 1995 | [JP] | Japan | 7-043500 |
| Feb. 8, 1995 | [JP] | Japan | 7-043501 |

[51] Int. Cl.⁶ .............. G03B 7/00; G03B 17/00
[52] U.S. Cl. .............. 396/299; 396/237
[58] Field of Search .............. 354/21, 289.12, 354/173.1, 173.11, 195.1, 195.12, 105, 106; 396/207, 208, 237, 245, 281, 292, 297, 299

[56] References Cited

U.S. PATENT DOCUMENTS

| 4,866,467 | 9/1989 | Taniguchi et al. | 354/21 |
| 4,943,825 | 7/1990 | Taniguchi et al. | 354/106 |
| 5,220,364 | 6/1993 | Kobayshi et al. | 354/21 |
| 5,289,216 | 2/1994 | Ohsawa et al. | 354/21 |
| 5,293,189 | 3/1994 | Taniguchi et al. | 354/21 |

*Primary Examiner*—David M. Gray
*Assistant Examiner*—Nicholas J. Tuccino

[57] ABSTRACT

A camera adapted to obtain a correct exposure, even with a film having a film sensitivity outside an automatic setting range of the camera. A film sensitivity outside the automatic setting range of the camera is stored, or canceled by manipulating a manipulation member in a manipulation order that differs from that used during photography. Further, two manipulation members may be used in a combined manipulation order that differs from that used during photography. For example, a zoom up and a zoom down switch may be used in conjunction with a main switch to set a higher and a lower, respectively, film sensitivity. Additionally, the setting may be canceled by manipulating the zoom up and zoom down switches simultaneously. A display device which normally displays photographic information regarding the camera, temporarily displays the manually set film sensitivity.

22 Claims, 3 Drawing Sheets